United States Patent
Profunser

[11] Patent Number: 6,131,959
[45] Date of Patent: Oct. 17, 2000

[54] PLUG-IN CONNECTION FOR THE JOINING OF PIPELINES TO HOSELINES

[76] Inventor: Herbert Profunser, Gerberstrasse 2, A-6832 Muntlix, Austria

[21] Appl. No.: 09/245,429

[22] Filed: Feb. 5, 1999

Related U.S. Application Data

[62] Division of application No. 08/667,539, Jun. 21, 1996, abandoned.

[30] Foreign Application Priority Data

Jun. 22, 1995 [DE] Germany .............. 195 22 691

[51] Int. Cl.⁷ .................................................. F16L 33/00
[52] U.S. Cl. ........................................ 285/256; 285/321
[58] Field of Search .............. 285/222.1, 222.2, 285/238, 256, 924, 321, 306; 277/613

[56] References Cited

U.S. PATENT DOCUMENTS

| | | | |
|---|---|---|---|
| 2,973,975 | 3/1961 | Ramberg et al. | 285/222.1 |
| 2,991,093 | 7/1961 | Guarnaschelli | 285/222.2 X |
| 3,409,314 | 11/1968 | Roe | 285/306 X |
| 5,082,315 | 1/1992 | Sauer | 285/256 |
| 5,775,738 | 7/1998 | Bartholomew | 285/321 X |
| 5,855,399 | 1/1999 | Profunser | 285/321 X |
| 5,961,157 | 10/1999 | Baron et al. | 285/256 |

FOREIGN PATENT DOCUMENTS 3-194288  8/1991  Japan ................................ 285/321

*Primary Examiner*—Lynne H. Browne
*Assistant Examiner*—Greg Binda
*Attorney, Agent, or Firm*—Gray Cary Ware & Friedenrich

[57] ABSTRACT

A plug-in connection is described for the joining of pipelines and hose lines, especially for use with pipeline systems of motor vehicles. The plug-in connection consists of an inner sleeve and an outer sleeve, which hold a hose line between them, so that a pipe socket can be shoved across the outer sleeve, which can be locked to the outer sleeve by means of a protective element. Inner sleeve and outer sleeve accommodate a sealing means which, supported by the pressure force of the pressurized medium acting on the inner sleeve, is pressed against the inner wall of the pipe socket.

3 Claims, 2 Drawing Sheets

PLUG-IN CONNECTION FOR THE JOINING OF PIPELINES TO HOSELINES

CROSS REFERENCE TO RELATED APPLICATIONS

The present invention is a divisonal of then U.S. application Ser. No. 08/667,539, filed on Jun. 21, 1996, now abandoned.

BACKGROUND

The invention concerns a plug-in connection for joining pipelines and hose lines.

A typical plug-in connection has become known, for example, from the disclosure of German Patent No. DE 38 13 192 A1. This typical plug-in connection basically consists of an outer plastic sleeve, which engages, by a sealing shoulder, with a corresponding receptacle on an inner sleeve. The inner sleeve has a groove opening radially outward in which a sealing ring is inserted. The disadvantage of this plug-in coupling is that the outer plastic sleeve must be fashioned as a relatively thick-wall plastic piece, which is very bulky. A plastic piece must be much thicker than a metal outer sleeve in order to transmit a corresponding amount of force. The seal produced in this already described plug-in coupling for connecting a hose to a pipe between the inner and the outer sleeve in the region of an inwardly directed radial ridge of the outer sleeve has the danger that the medium being transported will get into the nonsealed edge of the hose and thus impregnate the fabric or weave of the hose, with the known disadvantageous consequences.

Furthermore, another typical plug-in coupling is described in French Patent No. FR 26 67 922 A1, in which the plug-in coupling basically consists of an inner sleeve connected to an outer sleeve and a pipe socket. The pipe socket has a spring lock element, connected to the outer piece by a sealing ring arranged in a groove of the outer piece. In this plug-in coupling there is the disadvantage that the outwardly opening radical groove to accommodate the sealing ring is molded solely from the inner sleeve, which involves large manufacturing expense. Such a single-piece groove can only be crimped in a metal sleeve by a relatively complicated crimping process, which produces additional costs in the manufacture of such typical plug-in couplings. The making of a groove by a crimping process in plug-in couplings according to FR 26 67 922 A1 has the further disadvantage that the radii on the edge of the groove, i.e., where the vertical walls rise up, are configured relatively large and, thus, there is the danger that a sealing ring under pressure will be forced into these large spaces and then can no longer fulfill its sealing function against the opposite piece. Another substantial disadvantage of this plug-in coupling is that a relatively large axial length exists between the connection of inner and outer sleeves and the sealing ring, so that the room for inserting the hose in the connection space between inner and outer sleeve is relatively short (short axial length) and, therefore, the hose is supported and held only for a relatively short axial length. In order to assure a sufficient axial support length for the purpose of application of the hose in the plug-in coupling according to FR 26 67 922 A1, this coupling must be correspondingly material-intensive for its axial length and, thus, unattractive in price.

SUMMARY OF THE INVENTION

The purpose of the invention is to propose a plug-in connection which assures a secure connection under compact dimensions, maintaining an almost constant flow cross section and enhancing the sealing action with the help of the fluid or gaseous medium flowing through the plug-in connection.

In a first embodiment, the inner sleeve and the outer sleeve are joined together at one of their ends to form a common, continuous, outwardly opening radial annular groove, which serves to accommodate a sealing ring. The sealing ring lies against the outer sleeve and the inner circumference of the pipe socket. A protective element such as a spring element reaches through corresponding grooves of the pipe socket and locks it to the outer sleeve. A substantial advantage of this arrangement is that the flow cross section is not reduced in the coupling area. Moreover, the sealing ring lies in the groove formed by inner sleeve and outer sleeve and is additionally pressed against the inner wall of the pipe socket by the pressure of the medium flowing through the inner sleeve. This pressure force can be further boosted by providing an area of the inner sleeve, which forms the bottom of the groove, with ribs to provide a larger attachment surface. Thus, a greater pressing force on the sealing ring is achieved.

In another embodiment of the invention, the sealing ring is eliminated and the hose itself is used as the sealing means. In this embodiment, the end of the inner hose and that of the outer hose do not come together in an annular groove, but instead the inner sleeve is provided with a beveling so that the hose pushed onto the inner sleeve is radially enlarged. This makes the outer sleeve shorter than the inner sleeve so that an opening forms through which the outer edge of the hose, acting as a sealing lip, protrudes. The resulting sealing lip of the hose takes on the function of the sealing ring. Advantageously, the sealing lip is provided with a radius or a facet in order to facilitate the pressing of the coupling plug-in into the bore of the pipe socket and protect the sealing lip from mechanical damage. Again, a ribbed configuration of the beveling of the inner sleeve can ensure that the pressurized medium bolsters the sealing action of the lip because the sealing lip is pressed against the inner wall of the pipe socket due to the pressure of the fluid or gas in the pipe.

This coupling design reduces the sealing sites of the connection to only one sealing site. Furthermore, with this construction, only two parts are needed outside of the connection socket, (i.e., an inner sleeve and an outer sleeve). The mechanical form-fitted connection of the coupling plug-in to the pipe socket again occurs via locking projections and a locking piece, which may consist of spring steel wire or a locking feature molded onto the pipe socket. The advantage of this plug-in coupling of metal sleeves, according to the invention, lies particularly in its small size and reduced materials and thus more price-attractive configuration, along with outstanding sealing properties, thanks to the sealing joint configured relatively long in the axial direction. All information and features disclosed in the documents, including the summary, and particularly the special configuration represented in the drawings, are claimed as part of the invention, insofar as they are new relative to the state of the art, individually or in combination.

Hereafter, the invention shall be explained more closely by means of drawings showing several possible embodiments. The drawings and their description provide further features and advantages essential to the invention.

DETAILED DESCRIPTION OF THE PREFERRED EMBODIMENTS

Figure 1:
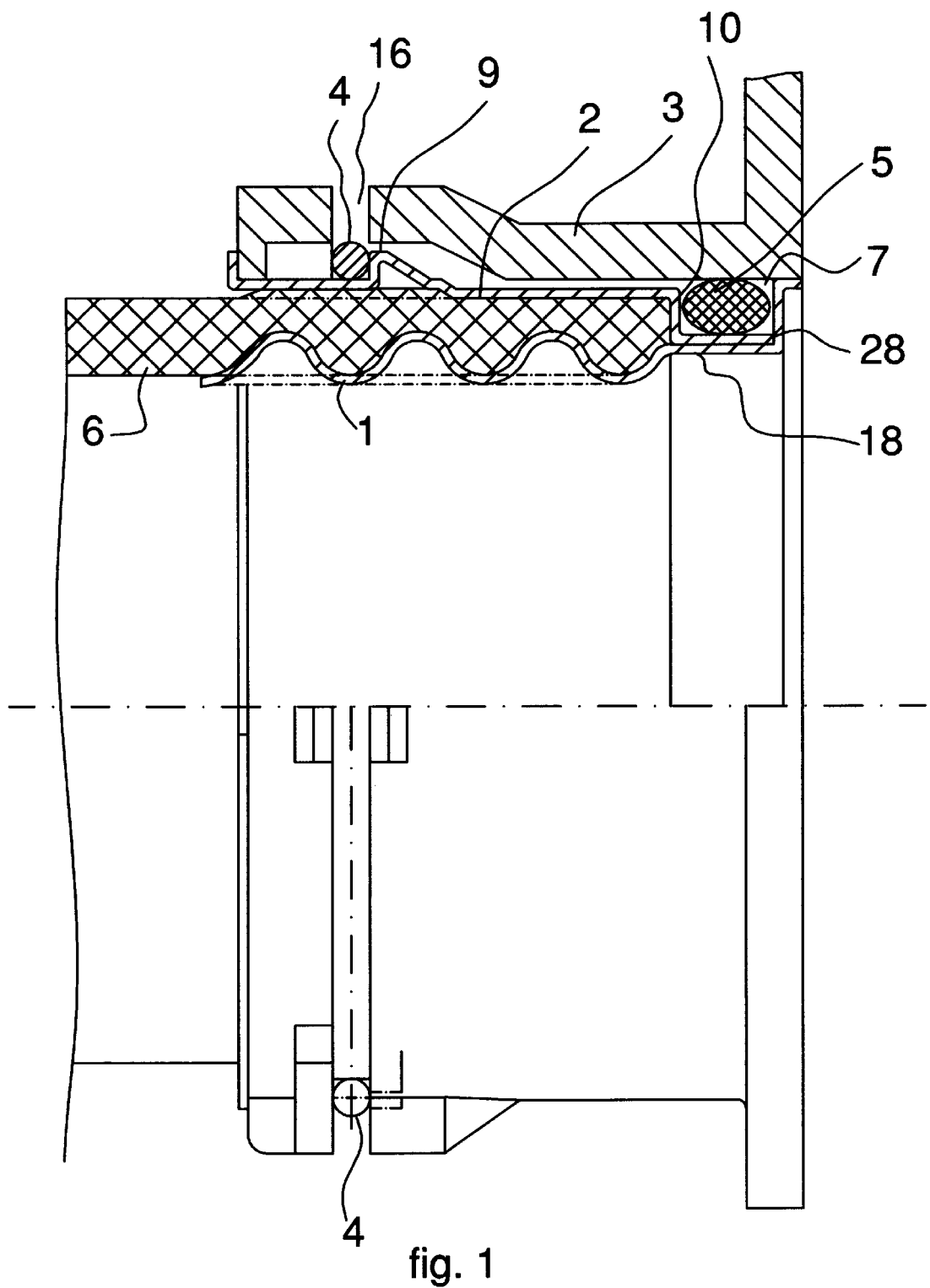
FIG. 1 illustrates a half section of a plug-in accordance with a first embodiment of the invention.

According to FIG. 1, the plug-in connection basically consists of an inner sleeve 1, an outer sleeve 2, and a pipe socket 3 placed over the outer sleeve 2. The inner sleeve 1 is inserted inside a hose 6, and the inner sleeve at first has a smooth wall, as represented by the broken lines. The wall of the inner sleeve 1 is then deformed such that continuous deformation grooves are formed and the hose 6 is clamped between inner sleeve 1 and outer sleeve 2. The outer sleeve 2 is pushed onto the outer circumference of the hose 6 and forms, at its axial rear end, a radially pointing flange 10 which serves as a stop for the edge of the hose 6.

Figure 2:
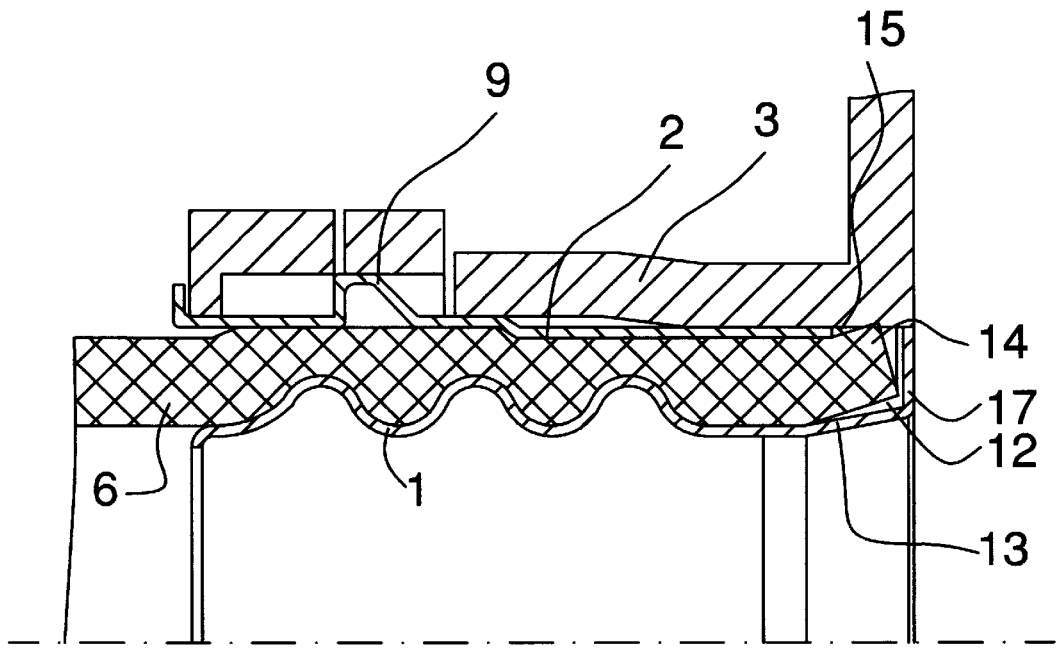
FIG. 2 illustrates a sectional view through a plug-in accordance with a second embodiment of the invention.
Figure 3:
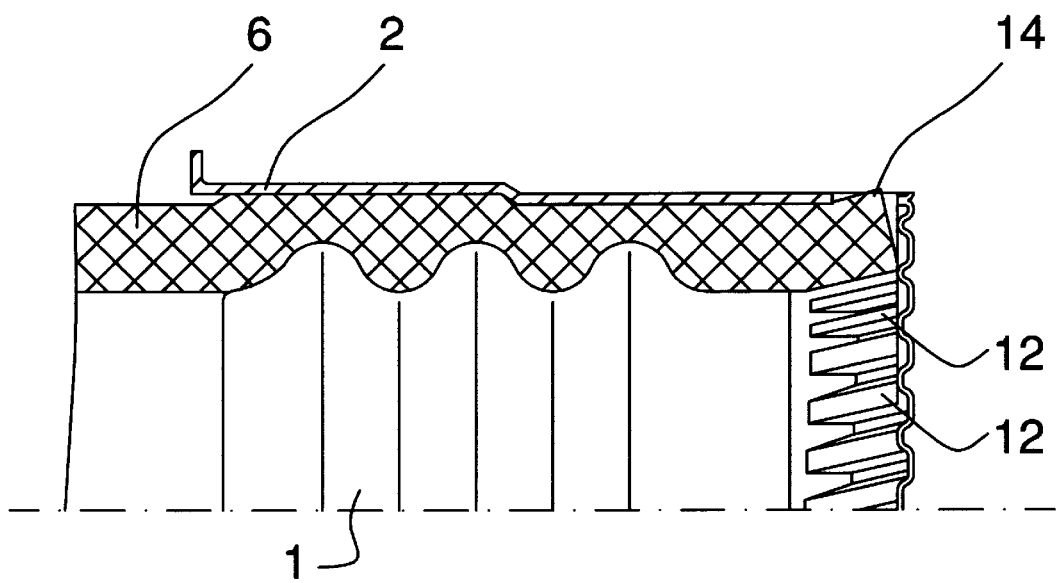
FIG. 3 illustrates a partial sectional view through the embodiment of the invention shown in FIG. 2.

The flange 10 adjoins an outwardly opening radial annular groove 7, which is formed together by the inner sleeve 1 and the outer sleeve 2, and which serves to accommodate a sealing ring 5. One radial wall of the annular groove 7 is formed by a wall of the flange 10 of the outer sleeve 2 and the other radial wall of this annular groove 7 is formed by a flange on the inner sleeve 1. The bottom of the annular groove is formed by parallel, press-fitted and tight-sealing axial cylinders of inner and outer sleeves 1, 2, placed one against the other. The tight press-fitting between the inner and outer sleeves 1, 2 in the area of an outwardly opening radial groove 28 leads to especially good sealing properties of this plug-in connection, so that the medium being sealed cannot penetrate to the hose 6, thus significantly increasing the lifetime of the hose. Alternatively, as shown in FIGS. 2 and 3, Due to the special sealing joint, moreover, the medium being sealed also penetrates into a cavity 12 (ribs) and forces itself underneath the hose 6 into this cavity, so that the sealing action of a sealing lip 14 against the outer sleeve 2 is strengthened by the outward radial force pressing on the hose 6. Furthermore, the annular groove 7 formed by deep-drawing from the inner and outer sleeves 1, 2 can be made in a simple and favorable way.

Referring again to FIG. 1, once the pipe socket 3 is pushed onto the arrangement consisting of the inner sleeve 1, the hose 6, and the outer sleeve 2, the sealing ring 5 lies tight between outer sleeve 2 and pipe socket 3. The plug-in connection is safeguarded by providing a detent spring 4 which reaches through corresponding slots 16 of the pipe socket 3 and interacts with a locking projection 9 of the outer sleeve 2. The locking projection 9 prevents an unintentional loosening of the connection. The medium under pressure flows inside the inner sleeve 1, exerting a corresponding pressure on the bottom surface 18 of the annular groove 7. This pressure acts on the sealing ring 5 and presses it against the inner wall of the pipe socket 3, which intensifies the sealing action.

FIGS. 2 and 3 show a further embodiment of the plug-in connection, eliminating the sealing ring and using, in its place, the hose 6 itself as the seal. In this embodiment, like parts are denoted by like numerals. Again, the inner sleeve 1 is inserted inside the hose 6 until the hose 6 comes up against a flange 17 of the inner sleeve 1. The outer sleeve 2 is pushed onto the outer circumference of the hose 6, but the outer sleeve 2 is shorter than the inner sleeve 1, so that outer sleeve 2 and inner sleeve 1 are not joined together. The axial end of the inner sleeve 1 has a continuous beveling 13, which conically enlarges the hose 6 in this region. The beveling 13 enlarges the hose 6 inside an opening 15 so that the outer edge of the hose 6 projects beyond the outer sleeve 2 and forms a sealing lip 14. The sealing lip 14 is advantageously provided with a radius or a facet. Thus, the outer edge of the base 6 forms the sealing lip 14. Once the pipe socket 3 is pushed onto the arrangement, the sealing lip 14 lies tightly against the inner wall of the pipe socket 3. Again, the pressurized gas or liquid in the hose acts on the beveling 13, transmitting a pressure force to the sealing lip 14, which is pressed more tightly against the inner wall of the pipe socket 3.

FIG. 3 illustrates the advantage of having the beveling 13 ribbed. These ribs 12 enlarge the attachment area for the pressurized medium and thus intensify the pressing force of the sealing lip 14 against the pipe socket 3.

The foregoing preferred embodiment has been described merely for illustrative purposes and is not considered to be limiting. Alternative embodiments can be practiced without departing from the invention. As such, the scope of the invention is intended to be restricted only by reference to the foregoing claims.

What is claimed is:

1. A plug-in connection for joining pipelines to hose lines conducting a medium under pressure, comprising:

an inner and an outer sleeve which hold a hose line to a pipeline;

a pipe socket fitted over the outer sleeve;

a protective element for locking the pipe socket to the outer sleeve; and means for sealing the inner and outer sleeves which is arranged between the inner sleeve and the outer sleeve and which abuts against an inner circumference of the pipe socket so that the medium under pressure flows inside of the inner sleeve and exerts pressure on the inner sleeve which presses the sealing means against the inner circumference of the pipe socket;

wherein said inner sleeve further comprises a beveling surface and a flange surface so that the hose is pushed across the beveling surface and an outer edge of the hose is radially expanded by the flange surface, and said outer sleeve being shorter than the inner sleeve so that an opening is formed between the inner sleeve and the outer sleeve, and said sealing means further comprising a sealing lip formed from the radially expanded outer edge of the hose so that the sealing lip protrudes into the opening and lies tightly against the inner circumference of the pipe socket.

2. A plug-in connection for joining pipelines to hose lines conducting a medium under pressure, comprising:

an inner and an outer sleeve which hold a hose line to a pipeline;

a pipe socket fitted over the outer sleeve;

a protective element for locking the pipe socket to the outer sleeve; and means for sealing the inner and outer sleeves which is arranged between the inner sleeve and the outer sleeve and which abuts against an inner circumference of the pipe socket so that the medium under pressure flows inside of the inner sleeve and exerts pressure on the inner sleeve which presses the sealing means against the inner circumference of the pipe socket;

wherein said inner sleeve further comprises a beveling surface and a flange surface so that the hose is pushed across the beveling surface and an outer edge of the hose is radially expanded by the flange surface, and said outer sleeve being shorter than the inner sleeve so that an opening is formed between the inner sleeve and the outer sleeve, and said sealing means further comprising a sealing lip formed from the radially expanded outer edge of the hose so that the sealing lip protrudes into the opening and lies tightly against the inner circumference of the pipe socket, wherein the beveling surface of the inner sleeve further comprises ribs or openings along the circumference of the beveling surface for the unhindered access of the pressurized medium to the sealing lip, wherein said ribs operate to enlarge the attachment area for the pressurized medium thereby intensifying the pressing force of said sealing lip against said pipe socket.

3. A plug-in connection for joining pipelines to hose lines conducting a medium under pressure, comprising:

an inner and an outer sleeve which hold a hose line to a pipeline;

a pipe socket fitted over the outer sleeve;

a protective element for locking the pipe socket to the outer sleeve; and means for sealing the inner and outer sleeves which is arranged between the inner sleeve and the outer sleeve and which abuts against an inner circumference of the pipe socket so that the medium under pressure flows inside of the inner sleeve and exerts pressure on the inner sleeve which presses the sealing means against the inner circumference of the pipe socket;

wherein said inner sleeve further comprises a beveling surface and a flange surface so that the hose is pushed across the beveling surface and an outer edge of the hose is radially expanded by the flange surface, and said outer sleeve being shorter than the inner sleeve so that an opening is formed between the inner sleeve and the outer sleeve, and said sealing means further comprising a sealing lip formed from the radially expanded outer edge of the hose so that the sealing lip protrudes into the opening and lies tightly against the inner circumference of the pipe socket, wherein said sealing lip is provided with a radius or facet.

* * * * *